(12) United States Patent
Hansson et al.

(10) Patent No.: US 9,961,459 B2
(45) Date of Patent: May 1, 2018

(54) METHOD FOR IMPROVING AUDIO EXPERIENCE FOR A USER OF AN AUDIO DEVICE

(71) Applicant: AXIS AB, Lund (SE)

(72) Inventors: Niklas Hansson, Hörby (SE); Anders Hansson, Klågerup (SE)

(73) Assignee: Axis AB, Lund (SE)

(*) Notice: Subject to any disclaimer, the term of this patent is extended or adjusted under 35 U.S.C. 154(b) by 86 days.

(21) Appl. No.: 14/938,397

(22) Filed: Nov. 11, 2015

(65) Prior Publication Data

US 2016/0165370 A1    Jun. 9, 2016

(30) Foreign Application Priority Data

Dec. 5, 2014   (EP) ..................... 14196430

(51) Int. Cl.
| | |
|---|---|
| H04R 5/00 | (2006.01) |
| H04R 27/00 | (2006.01) |
| H04W 4/00 | (2018.01) |
| H04W 4/16 | (2009.01) |
| H04W 4/20 | (2018.01) |
| H04L 29/06 | (2006.01) |

(52) U.S. Cl.
CPC ......... *H04R 27/00* (2013.01); *H04L 65/1086* (2013.01); *H04W 4/008* (2013.01); *H04W 4/16* (2013.01); *H04W 4/206* (2013.01); *H04R 2227/003* (2013.01); *H04R 2420/07* (2013.01)

(58) Field of Classification Search
CPC .............. H04R 27/00; H04R 2420/07; H04R 2227/003; H04L 65/1086; H04W 4/008; H04W 4/16; H04W 4/206

USPC ........................................................... 381/80
See application file for complete search history.

(56) References Cited

U.S. PATENT DOCUMENTS

| | | | |
|---|---|---|---|
| 6,999,769 B1 | 2/2006 | Henon | |
| 2003/0013503 A1* | 1/2003 | Menard | H04M 1/0291 455/569.2 |
| 2004/0098488 A1* | 5/2004 | Mayers | H04L 12/1831 709/228 |
| 2006/0227728 A1* | 10/2006 | Baumann | H04L 29/06027 370/260 |
| 2010/0254554 A1* | 10/2010 | Fusakawa | H04R 25/554 381/315 |
| 2013/0205191 A1 | 8/2013 | Ramachandran et al. | |

(Continued)

FOREIGN PATENT DOCUMENTS

GB    2452020 A    2/2009

OTHER PUBLICATIONS

Dalton-Noblitt, April. "Why Use a Card When I Have My Phone?" 3 pages (Nov. 19, 2012).

(Continued)

*Primary Examiner* — William A Jerez Lora
(74) *Attorney, Agent, or Firm* — Volpe and Koenig, P.C.

(57) ABSTRACT

A method for improving audio experience for a user of an audio device is provided. The method includes establishing a communication channel between the audio device and a remote client; detecting a peripheral audio device in the vicinity of the audio device; establishing a temporary communication channel between the peripheral audio device and the remote client; and transferring, via the temporary communication channel, audio data between the peripheral audio device and the remote client.

13 Claims, 5 Drawing Sheets

(56) References Cited

U.S. PATENT DOCUMENTS

2014/0087705 A1* 3/2014 Wooster ............... H04B 5/0031
                                                          455/416
2014/0254799 A1* 9/2014 Husted ................. H04L 63/068
                                                          380/270

OTHER PUBLICATIONS

"Connect TCS:BUS® systems—Door communication new defined" 8 pages.

* cited by examiner

METHOD FOR IMPROVING AUDIO EXPERIENCE FOR A USER OF AN AUDIO DEVICE

CROSS REFERENCE TO RELATED APPLICATION

This application claims the benefit of European Patent Application No 14196430.4 filed on Dec. 5, 2014, which is incorporated by reference as if fully set forth.

FIELD OF INVENTION

The invention relates to an audio device and in particular to a method for improving audio experience for a user of such an audio device.

BACKGROUND

To successfully achieve a desired auditory experience for a user of an audio device it is required that there is an efficient transfer of auditory information between the audio device and the user. The transfer of auditory information is, however, often affected by the environment of the audio device. The acoustics of the location where the audio device is placed may for example impair the quality of the auditory information that is transferred. Objects in the environment may furthermore obstruct the transfer of auditory information such that the auditory experience is affected. A common solution to overcome such problems is to increase the degree of loudness or the intensity of a sound, i.e. increase the volume of the sound that is emitted to and/or from the audio device. Such a solution may, however, disturb the environment of the audio device. An increased volume may lead to that sensitive information may be overheard by other persons than the user of the audio device. Increasing the volume of the sound may moreover introduce distortions such that quality of the auditory information that is transferred is reduced.

Hence there is a need for improved transfer of auditory information between an audio device and the user of the audio device.

SUMMARY

It is an object of the present invention to provide improved audio experience for a user of an audio device. This and other objectives are achieved by providing a method, where the method comprises: establishing a communication channel between the audio device and a remote client; detecting a peripheral audio device in the vicinity of the audio device establishing a temporary communication channel between the peripheral audio device and the remote client; and transferring, via the temporary communication channel, audio data between the peripheral audio device and the remote client.

It is an advantage that a temporary communication channel is established between the peripheral audio device and the remote client when they are in the vicinity of each other as it allows a user of the remote client and a user of the audio device to communicate via the peripheral audio device. In other words, audio data pertaining to audio signals are transferred more efficiently between the two users. An efficient selection of users, i.e. a limitation of the number of users, to which the temporary communication channel may be established, is further provided as the temporary communication channel is provided when the peripheral audio device is detected to be in the vicinity of the audio device. The load induced on the audio device is thereby reduced such that for instance the power consumption and/or the bandwidth that is required for operating the audio device are reduced.

The transmission of audio between the remote client and the peripheral audio device is further less influenced by sounds in the environment of the audio device. An improved directionality of the emitted audio signal may be obtained. Hence, problems associated with emitted audio signals disturbing the environment of the audio device is reduced. The risk that sensitive information may be overheard by other persons than the user of the audio device is reduced.

The term audio experience should be construed as the perceived audio signal that a user of the audio device experiences. The audio signal may comprise frequencies in the audio frequency range of about 20 to 20,000 Hz. In other words, the audio signal comprises at least one tone that is audible for a human. The audio signal may comprise a plurality of tones which are simultaneous or sequential in time. The audio signal may be emitted from a loudspeaker.

The term audio data should be understood as data representing any audio signal.

The term audio device should be understood as a device comprising one or more units being arranged to emit and/or record audio; that is, comprising a loudspeaker and/or microphone.

The term communication channel refers to a channel through which information may be conveyed. The information may for example comprise data in the form of a digital bit stream which is transferred from one or several senders/transmitters to one or several receivers.

The term vicinity should be understood as close by or nearby such that two objects being located in the vicinity of each other may efficiently communicate via interacting electromagnetic fields. In other words, the two objects may communicate via transmission of data via electromagnetic fields. The communication may be via wireless use of electromagnetic fields to transfer data such as in radio-frequency identification technologies where the distance between the objects corresponds to the wavelength of the electromagnetic fields used or multiples thereof. The communication may further be via short-range wireless communication utilizing electromagnetic near-fields such that the distance between the objects is sub-wavelength. The term vicinity may further be understood as a read range, i.e. the distance within which two objects may communicate efficiently via the interacting electromagnetic fields such that information may be read/received by at least one of the objects. The extent of the read range depends on a number of factors, including the frequency of the electromagnetic fields, typically radio waves, used for the communication, the size of the emitter/receiver of the electromagnetic fields, and the power output of the electromagnetic fields. The read range for radio-frequency identification technologies may therefore range, typically, from centimeters to decimeter distances for near-field communication and from decimeters to tens of meters for Bluetooth, Bluetooth low energy or radio-frequency identification technologies applications utilizing frequency bands from kHz to GHz.

The communication may further be understood as transmission of visible electromagnetic fields, i.e. as photons, between the two objects such that visual information, e.g. a visual indication, may be read by for instance a camera of one of the objects communicating. The communication channel and/or the temporary communication channel may be a Session Initiation Protocol (SIP) call. The SIP call is advantageous as it allows for the use of communication protocols for controlling multimedia communication sessions over for example Internet Protocol (IP) networks. In other words, based on SIP, at least one of the communication channels take advantage of a SIP service providing a SIP-based Voice over Internet Protocol (VoIP) network. VoIP utilizes hardware and software to enable the use of an intranet or the Internet as the transmission medium for, for example, telephone calls by sending audio data in packets using IP rather than by traditional circuit transmissions. A more well controlled and flexible transfer of audio data is thereby achieved.

The temporary communication channel may be maintained as long as the peripheral audio device is in the vicinity of the audio device.

The temporary communication channel may be maintained during a predetermined time period. Reducing the duration of the temporary communication channel reduces, for example, constraints on power and/or bandwidth of the audio device and/or the peripheral audio device. New temporary communication channels may further be achieved without interference from previously established temporary communication channels.

The detecting of a peripheral audio device in the vicinity of the audio device may be achieved via near-field communication, radio-frequency identification or Bluetooth. Efficient detection is thereby provided which may utilize existing standardized wireless radio frequency technologies. Radio-frequency identification (RFID) utilizes unique identification of devices using radio waves. Near-field communication (NFC) may be considered as a subclass of the RFID technology. More specifically, NFC is a branch of high-frequency (HF) RFID, both operating at the 13.56 MHz frequency. NFC is designed to offer secure data exchange, where a device using NFC is capable of being both an NFC reader and an NFC tag allowing NFC devices to communicate peer-to-peer. Bluetooth is also a wireless technology standard for exchanging data over short distances (using short-wavelength UHF radio waves. In other words, communication is achieved via wireless use of electromagnetic fields 124 to transfer data. A more secure communication between the audio device and the peripheral audio device is thereby obtained which for example reduces problems associated with eavesdropping.

The detecting of a peripheral device in the vicinity of the audio device may be achieved via a QR code, a barcode or a text. The QR code, the barcode or the text may be arranged at the peripheral device and/or at the audio device. Hence, a visual indication may be used to establish a temporary communication channel between a peripheral audio device and a remote client. The detecting of a peripheral device in the vicinity of the audio device may be achieved via a visual indication.

A camera of the audio device and/or peripheral audio device may be arranged to detect the QR code, the barcode, or the text.

The establishing of the temporary communication channel between the peripheral audio device and the remote client may comprise a transfer of a SIP call between the remote client and the audio device to a SIP call between the peripheral audio device and the remote client.

SIP based communication between the user of the audio device and the user of the remote client is thereby achieved via the peripheral audio device and via the temporary communication channel. This is advantageous as the temporary communication channel provides a direct channel for transmission of audio data which improves the audio experience for a user of an audio device.

The method may further comprise closing the communication channel between the audio device and the remote client after the temporary communication channel between the peripheral audio device and the remote client is established. Hence, communication between a user of the audio device and a user of the remote client is achieved only via the peripheral audio device and via the temporary communication channel. A more effective communication is thereby achieved and the constraints of the audio device are thereby reduced. A simpler audio device may thereby also be used.

The method may further comprise providing an address identifying the remote client to the peripheral device.

The method may further comprise providing an address identifying the peripheral device to the remote client.

Transfer of the address of the audio device, the peripheral audio device and/or the remote client simplifies the detecting of the peripheral device in the vicinity of the audio device and moreover the establishment of the temporary communication channel.

The audio device may be an intercommunication station of an intercommunication system. The term intercommunication station should be understood as a station which allows for a one- or two-way audible communication, also referred to as simplex or duplex communication respectively, between two separated locations. The duplex communication may be full-duplex or half-duplex. The intercommunication station thereby allows for point-to-point communication. The intercommunication station may for example allow a person speaking into the intercommunication station to be heard at a location being remote from the intercommunication station. A person being near the intercommunication station may further be communicated with via the intercommunication station.

The peripheral device may be a cell phone, a personal digital assistant, a computer, a tablet computer or a headset for any of these devices.

The method may further comprise transferring, via the temporary communication channel, visual data between the peripheral audio device and the remote client, wherein the visual data comprises a still image or a video sequence. Multimedia content may thereby be transferred via the temporary communication channel.

It is noted that the invention relates to all possible combinations of features recited in the claims.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention.

The figures are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
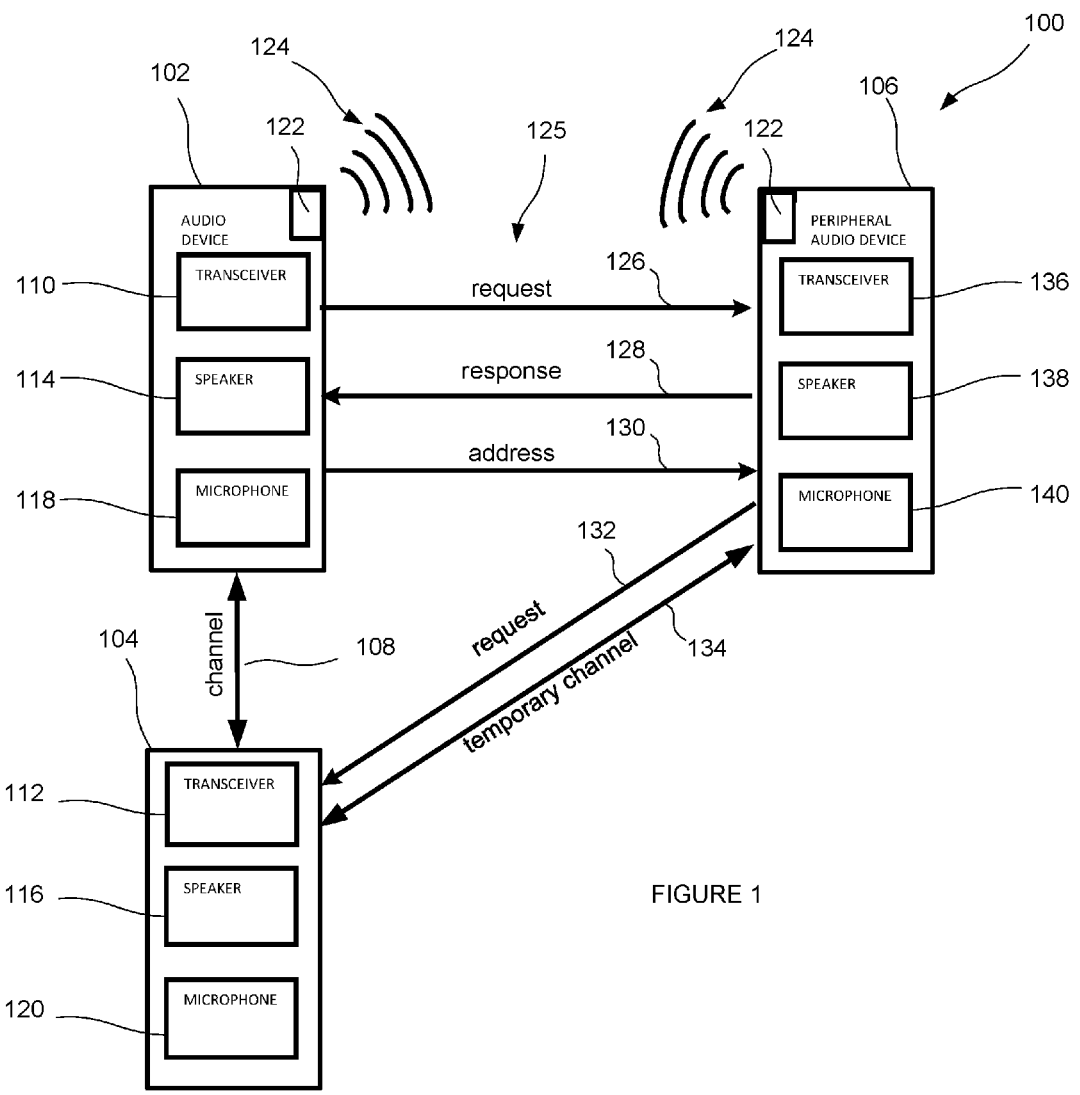
FIG. 1 illustrates a system arranged to improve the audio experience for a user of an audio device according to one embodiment.

FIG. 1 illustrates a system 100 arranged to improve the audio experience for a user of an audio device 102. This is achieved by providing efficient communication between a user of a remote client 104 and a user of the audio device 102 via a peripheral audio device 106. The remote client 104 is remotely located in relation to the audio device 102. In other words, the remote client 104 and the audio device 102 are separated by a distance such that their users cannot directly communicate with each other without the use of auxiliary devices.

The audio device 102 and the remote client 104 are in communication via a communication channel 108. The communication channel 108 is established by exchange of data between transceiver units 110 and 112 of the audio device 102 and the remote client 104, respectively. The communication channel 108 thereby allows for information to be conveyed, i.e. transferred, between the remote client 104 and the audio device 102. The information may for example comprise data in the form of a digital bit stream. The communication channel 108 thereby allows for transfer of audio data, the audio data representing any audio signal emitted and/or received by loudspeakers 114, 116 and microphones 118, 120, of the audio device 102 and the remote client 104, respectively.

The audio device 102 and the peripheral audio device 106 comprise detection units 122 arranged to transmit and/or receive electromagnetic fields 124 such that a detection of the peripheral audio device 106 being in the vicinity of the audio device 102 is achieved. The detection units 122 are arranged such that the audio device 102 and the peripheral audio device 106 efficiently communicate information 125 via the interaction of the electromagnetic fields 124 when the audio device 102 and the peripheral audio device 106 are in the vicinity of each other. In other words, when the peripheral audio device 106 is for example brought to a location in the vicinity of the audio device 102 an efficient communication via the interacting electromagnetic fields 124 is achieved. The communication is achieved via wireless use of electromagnetic fields 124 to transfer data. The wireless use of the electromagnetic fields includes radio-frequency identification technologies utilizing short-range wireless communication where the distance between the objects is sub-wavelength, also referred to as near-field communication (NFC). NFC is advantageous as disturbance from and/or communication to/from other peripheral audio devices (now shown) are reduced. A more secure communication between the audio device 102 and the peripheral audio device 106 is thereby obtained which for example reduces problems associated with eavesdropping.

As discussed above, the detection units 122 are active and may thereby receive or read information 125 as well as emit information 125 pertaining, for example, to the address of the audio device 102 or the peripheral audio device 106.

FIG. 1 illustrates that after the detection of the peripheral device 106, being in the vicinity of the audio device 102, information 125 may be transmitted between them. The information 125 may, for example, comprise a request 126 from the audio device 102 to the peripheral audio device 106 asking for an establishment of an additional communication channel (not shown). The peripheral audio device 106 may thereby send a response 128 to the audio device 102 comprising information such that the additional communication channel between the audio device 102 and the peripheral audio device 106 may be established.

In order for the remote client 104 to communicate with the peripheral audio device 106 an address 130 of the remote client 104 may be sent from the audio device 102 to the peripheral audio device 106, this will be more discussed below in connection with FIG. 3a. In order to solve security issues for this approach a one-time proxy address could be used. That way, a visitor will not be able to connect to the remote client 104 later, unless she gets a new address 130 to the remote client 104. Alternatively, an address 131 of the peripheral audio device 106 may be sent to the remote client 104 via the audio device 106, this will be more discussed below in connection with FIG. 3b. This approach is preferred from a security perspective, since that does not give the peripheral audio device 106 access to the inside network on which the remote client is connected.

An address 130 of the remote client 104 may further be sent from the audio device 102 to the peripheral audio device 106 such that the peripheral audio device 106 may, in order to establish communication between the peripheral device 106 and the remote client 104, send a request 132 to the remote client 104. A temporary communication channel 134 may thereby be established between the peripheral audio device 106 and the remote client 104 such that a user of the remote client 104 and a user of the peripheral audio device 106 may communicate over the temporary communication channel 134.

The temporary communication channel 134 is established by communication between the transceiver unit 112 of the remote client 104 and a transceiver 136 of the peripheral audio device 106. It should, however, be noted that the remote client may comprise a plurality of transceivers which each may be used for the establishment of a communication channel.

The communication channel 108 and the temporary communication channel 134 may be Session Initiation Protocol (SIP) calls. The use of a SIP call is advantageous as it allows for the use of communication protocols for controlling multimedia communication sessions over for example Internet Protocol (IP) networks. Voice, and/or video calls may thereby utilize the established communication channels 108 and 134. The SIP further defines the format of the messages that are sent between the elements of the system 100. Hence, a data link is provided which allows an audio signal to be transformed into audio data, also referred to as IP data. In other words, analog audio signals are transformed into digital audio data which is transferred using SIP over the established communication channels 108 and 134. An advantage of using SIP is furthermore that SIP offers increased flexibility to add new connections, i.e. additional channels may easily be added in the system 100. SIP calls may therefore be used for two-party (unicast) or multiparty (multicast or conference) sessions. Several users in the vicinity of the audio device may, as an example form a multicast session with a user of the remote client. This may be achieved via each user in the vicinity of the audio device establishing an individual temporary communication channel via their respective peripheral audio devices such that they are in simultaneous contact with the users of the remote client. A user of the audio device may correspondingly be in simultaneous contact with several users of the remote client. To this end, several users of the remote client may via temporal communication channels communicate with several users in the vicinity of the audio device such that a multiparty session is formed.

The establishment of the temporary communication channel 134 between the peripheral audio device 102 and the remote client 104 may comprise a transfer of a SIP call between the remote client 104 and the audio device 102 to a SIP call between the peripheral audio device 106 and the remote client 104. The communication channel 108 between the audio device 102 and the remote client 104 may be closed after the temporary communication channel 134 between the peripheral audio device and the remote client has been established. Hence, the communication between the audio device 102 and the remote client 104 is achieved via the peripheral audio device 106 and more specifically via the temporary communication channel 134. This is advantageous as the temporary communication channel 134 provides a direct channel for transmission of audio signals emitted and/or received by the loudspeaker 116 and microphones 120 of the remote client 104 and a loudspeaker 138 and a microphone 140 of the peripheral audio device 106. This improves the audio experience for a user of an audio device 102. Problems associated with the audio device 102 being affected by its environment are, moreover, mitigated. The peripheral audio device 106 may for example be placed closed to the ear of a user such that the acoustics of the location and objects in the environment of the user are less likely to influence the audio experience of the user. An improved transfer of auditory information is further achieved. The volume of sound of the audio signals emitted by the peripheral audio device 104 may thereby also be reduced compared to the volume of the audio device 102. An improved directionality of the emitted audio signal is further obtained. Hence, problems associated with emitted audio signals disturbing the environment of the audio device 102 is reduced. The risk that sensitive information may be overheard by other persons than the user of the audio device is reduced.

The temporary communication channel may be maintained as long as the peripheral audio device is in the vicinity of the audio device. The temporary communication channel may also be maintained during a predetermined time period. This reduces, for example, constraints on power and/or bandwidth of the audio device and/or the peripheral audio device. New temporary communication channels may further be achieved without interference from older temporary communication channels. It should be noted that the time period may vary depending on application of the audio device. The time period may for example vary between tens of seconds to several minutes. The former time period may be enough to allow for communication between a user of the remote client and a user of the peripheral audio device such that for example the identity and purpose of the user of the peripheral audio device is revealed to the user of the remote client. This is for example advantageous if the audio device is an intercommunication station such as a door station. The remote client may, based on the identification of the user of the peripheral audio device, allow passage through a door for the identified user. Longer time periods may for example be needed during installation and/or set up of an intercommunication station.

According to other embodiments, the temporary communication channel is maintained as long as two of its users are using the temporary communication channel. According to yet other embodiments the temporary communication channel is maintained as long as it is not terminated by one of its users.

It should be noted that in another embodiment one of the detection units describe above may be passive. This may be advantageous as the passive detection unit does not require any powering. The passive detector unit will, however, induce a change in the electromagnetic field of the active detection unit interacting with the passive detection unit. As a result a modulation of the electric field follows which allows information to be transmitted between the two detection units. This information may, for example, comprise the address of the remote client such that a temporary communication channel may be established based on the address.

In other embodiments the distance between the audio device and the peripheral audio device may correspond to the wavelength of the electromagnetic fields used or multiples thereof such as in radio-frequency identification or Bluetooth applications. This increases the range within which peripheral audio devices may be detected in the vicinity of the audio device.

SIP calls may further comprise transferring, via the temporary communication channel 134, of visual data between the peripheral audio device 106 and the remote client 104, wherein the visual data comprises a still image or a video sequence. The still image and/or the video sequence may be obtained by using a camera (not shown) of the remote client 104 and/or the peripheral audio device 106. To this end, SIP can be used for creating, modifying and terminating sessions consisting of one or several media streams.

To this end, it should be noted that the audio device 102 and/or the remote client 104 may further (not shown) comprise a camera and/or a display such that multimedia content, i.e. images and/or video streams of images may be transmitted in addition to audio data via the communication channel 108.

Visual indications may further be used to establish the temporary communication channel between the peripheral audio device and the remote client. The detecting of a peripheral device in the vicinity of the audio device may be achieved via a visual indication such as a Quick Response (QR) code, a barcode or a text.

Figure 2:
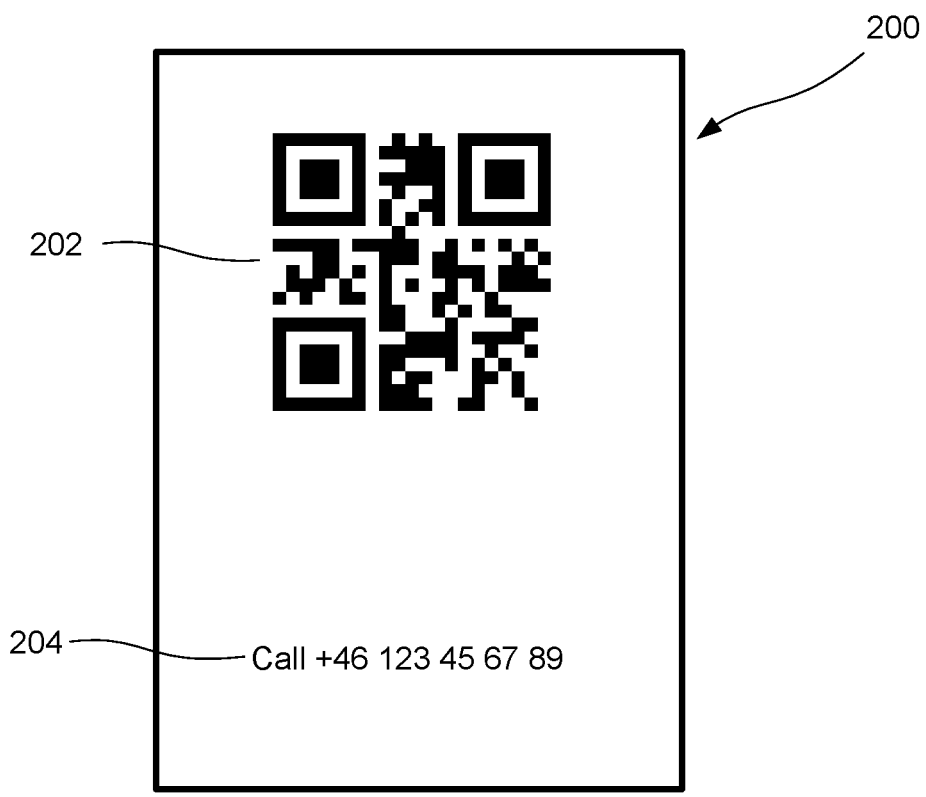
FIG. 2 illustrates a display of a peripheral audio device according to one embodiment.

FIG. 2 illustrates a display 200 of a peripheral audio device on which a QR code 202 is displayed. Capturing of the visual indication is made by a camera of an audio device in the vicinity of the peripheral audio device. The QR code 202 displays the instruction "Call +46 123 45 67 89", as further displayed as a text 204 on the display 200. The camera of the audio device thereby registers the visual indication and acquires the information, i.e. in this example an address to the peripheral audio device in the form of a telephone number. By further establishing a SIP call utilizing this address, information is transmitted between the audio device and the peripheral audio device. As discussed in relation to FIG. 1, this information may comprise data from the audio device such that a request is sent to the peripheral audio device asking for an establishment of a communication channel. The peripheral audio device may thereby send a response to the audio device such that the communication channel between the audio device and the peripheral audio device is established. Additionally, in order to facilitate that communication between the peripheral audio device and the remote client is established an address of the remote client is sent from the audio device to the peripheral audio device or alternatively, an address of the peripheral audio device is sent to the remote client via the audio device. A temporary communication channel may thereby be established between the peripheral audio device and the remote client.

In other embodiments a camera of a peripheral audio device captures a visual indication. The visual indication may for example be displayed on or in the vicinity of the audio device. The visual indication may provide information on how to establish a communication channel with the audio device. A detection of the peripheral audio device being in the vicinity of the audio device is thereby achieved. Alternatively, the visual indication may provide information on how to establish a communication channel between the peripheral audio device and the remote client. The visual information may for example provide an address to the remote client. The address may be an address allowing a SIP call to be established between the peripheral audio device and the remote client. This will allow the temporary channel to be established between the peripheral device and the remote client. It shall however be emphasized that even though the temporary channel is in the end established between the peripheral device and the remote client, the audio device is always involved in setting this up. Moreover, the communication channel between the remote client and the audio device is maintained during the duration of the temporary channel between the peripheral device and the remote client. The maintained communication channel between the remote client and the audio device may be used for, e.g., video transfer, unlocking a door close to the audio device or turning on lights. According to one example, the temporary channel between the peripheral device and the remote client is achieved in that the peripheral device joins an ongoing SIP call between the audio device and the remote client using three-way SIP call for at least the audio part of the SIP call.

Figure 3A:
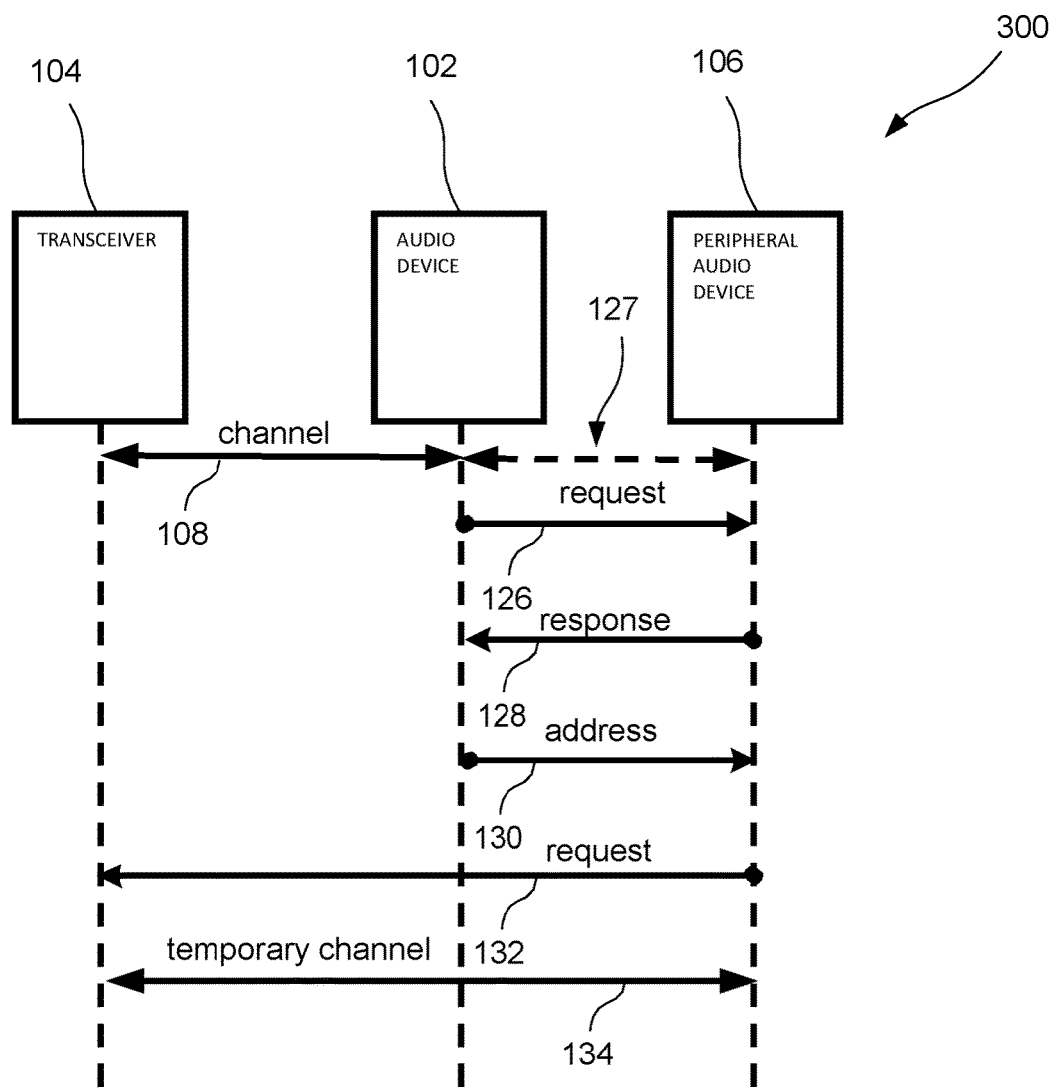
FIGS. 3a and 3b illustrate communication schemes for establishing a temporary communication channel between a remote client and a peripheral audio device.
Figure 3B:
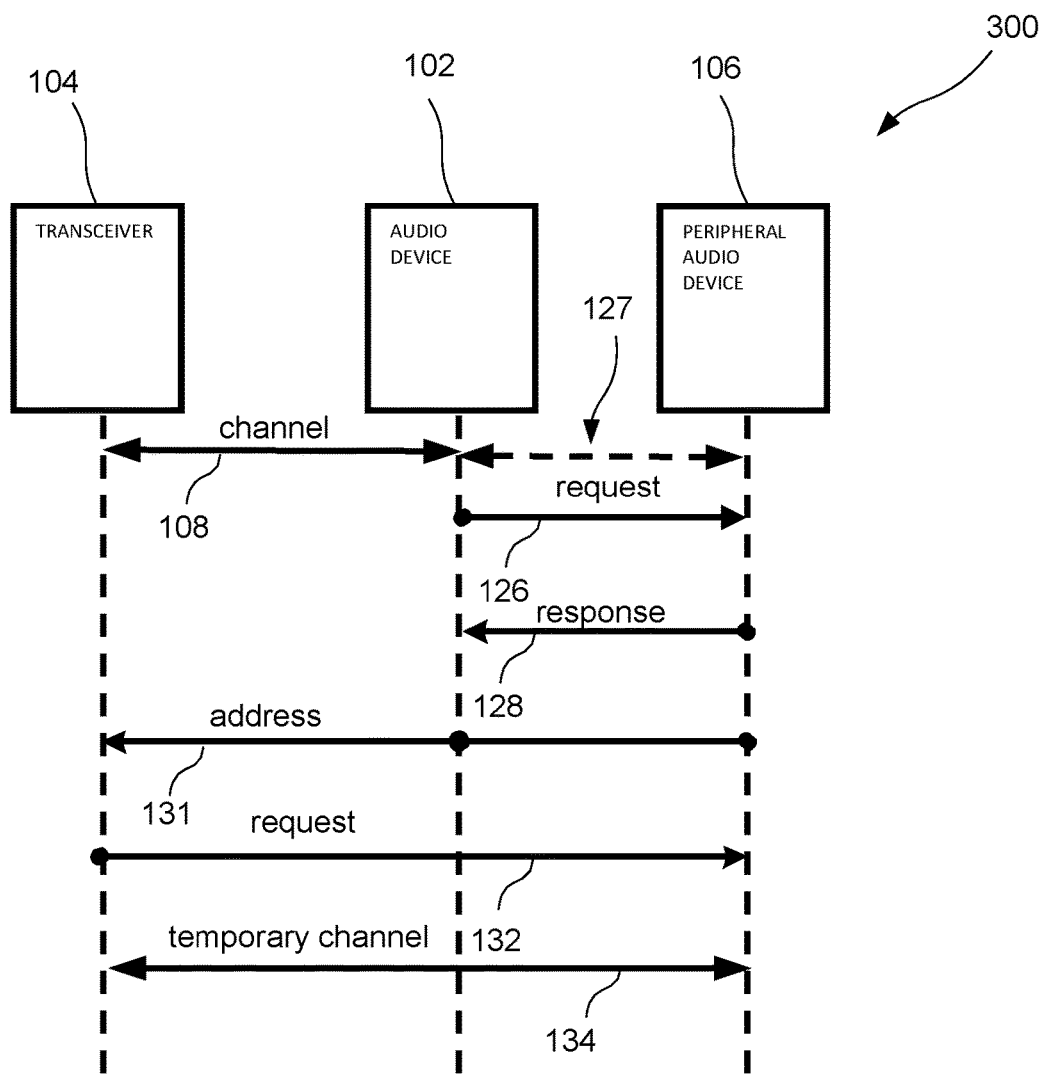

FIGS. 3a and 3b illustrate examples of communication schemes 300 for establishing a temporary communication channel 134 between a remote client 104 and a peripheral audio device 106.

In FIG. 3a a communication channel 108 has been established between an audio device 102 and the remote client 104. A request 126 is sent from the audio device 102 to the peripheral audio device 106 after the detection of the peripheral audio device 106 being in the vicinity of the audio device 102. The request 126 asks for an establishment of an additional communication channel 127, shown in FIG. 3a as a dotted double sided arrow. The peripheral audio device 106 thereafter sends a response 128 to the audio device 102 comprising information such that the additional communication channel 127 between the audio device 102 and the peripheral audio device 106 is established.

An address 130 identifying the remote client 104 to the peripheral audio device 106 is sent form the audio device 102 to the peripheral audio device 106 such that the peripheral audio device 106 may, in order to establish communication between the peripheral audio device 106 and the remote client 104, send a request 132 to the remote client 104. The request 132 may comprise an address to the peripheral audio device 106. A temporary communication channel 134 may thereby be established between the peripheral audio device 106 and the remote client 104 such that a user of the remote client 104 and a user of the peripheral audio device 106 may communicate over the temporary communication channel 134.

In FIG. 3b an address 131 identifying the peripheral audio device 106 to the remote client 104 is provided. The address 131 is sent via the audio device 102 to the remote client 104 such that the remote client 104 may, in order to establish communication between the peripheral audio device 106 and the remote client 104, send a request 132 to the peripheral audio device 106. The request 132 may comprise an address to the remote client 104. A temporary communication channel 134 is thereby established between the peripheral audio device 106 and the remote client 104.

According to another embodiment (not shown) the address identifying the peripheral audio device 106 to the remote client 104 is sent directly from the peripheral audio device 106 to the remote client 104. The address may for example be provided in the request sent from the peripheral audio device to the remote client.

According to yet another embodiment the communication between the user of the audio device and the user of the remote client may be via a temporary communication channel formed by the communication channel 108 and the additional communication channel 127.

The person skilled in the art realizes that other communication schemes may be used for establishing a temporary communication channel between a remote client and a peripheral audio device.

Figure 4:
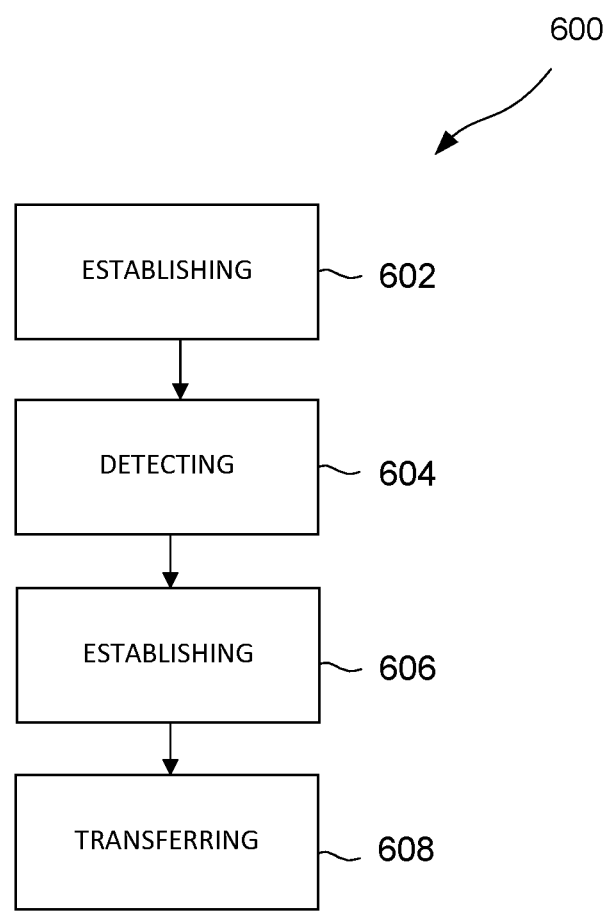
FIG. 4 illustrates a method for improving the audio experience of a user of an audio device according to one embodiment.

Referring to FIG. 4, a method for improving audio experience for a user of an audio device is illustrated, where the method comprises establishing a communication channel between the audio device and a remote client (602); detecting a peripheral audio device in the vicinity of the audio device (604); establishing a temporary communication channel between the peripheral audio device and the remote client (606); and transferring via the temporary communication channel, audio data between the peripheral audio device and the remote client (608).

The function and benefits of using the method 600 are described above in relation to the system 100 comprising the audio device and the benefits of using a temporary communication channel between the peripheral audio device and the remote client. In order to avoid undue repetition, reference is made to the above.

The person skilled in the art realizes that the present invention by no means is limited to the preferred embodiments described above. On the contrary, many modifications and variations are possible within the scope of the appended claims.

For example, data may be transmitted over a fixed line such as a telephone line, such that a communication channel between the audio device and the remote client is established. The skilled person realizes that other means for transmission of data may be used such that the communication channel is established between the audio device and the remote client.

The peripheral device may be any personal digital device capable of communicating with the audio device, e.g., a cell phone, a personal digital assistant, a computer, a tablet computer, or a headset for any of these.

To ensure security, the temporary communication channel and/or the communication channel may use encryption when sending data comprising sensitive information such as a telephone number.

Additionally, variations to the disclosed embodiments can be understood and effected by the skilled person in practicing the claimed invention, from a study of the drawings, the disclosure, and the appended claims.

What is claimed is:

1. A method for improving audio experience for a user of a door station of an intercommunication system, the method comprising:
   establishing a communication channel between the door station and a remote client;
   detecting a peripheral audio device in the vicinity of the door station;
   establishing a temporary communication channel between the peripheral audio device and the remote client, wherein the temporary communication channel is established in response to the remote client receiving a request from the peripheral audio device;
   transferring, via the temporary communication channel, audio data emitted and received from the peripheral audio device to the remote client; and
   terminating the temporary communication channel between the peripheral audio device and the remote client, wherein the communication channel between the remote client and the door station is maintained while establishing and terminating the temporary channel between the peripheral device and the remote client.

2. The method according to claim 1, wherein the communication channel and/or the temporary communication channel is a Session Initiation Protocol (SIP) call.

3. The method according to claim 1, wherein the temporary communication channel is maintained as long as the peripheral audio device is in the vicinity of the door station.

4. The method according to claim 1, wherein the temporary communication channel is maintained during a predetermined time period.

5. The method according to claim 1, wherein the detecting of a peripheral audio device in the vicinity of the door station is achieved via near-field communication, radio-frequency identification or Bluetooth.

6. The method according to claim 1, wherein the detecting of a peripheral device in the vicinity of the door station is achieved via a quick response (QR) code, a barcode or a text.

7. The method according to claim 6, wherein a camera of the door station and/or peripheral audio device is arranged to detect the QR code, the barcode, or the text.

8. The method according to claim 1, wherein the establishing of the temporary communication channel between the peripheral audio device and the remote client comprises a transfer of a SIP call between the remote client and the door station to a SIP call between the peripheral audio device and the remote client.

9. The method according to claim 1, the method further comprising providing an address identifying the remote client to the peripheral audio device.

10. The method according to claim 1, the method further comprising providing an address identifying the peripheral audio device to the remote client.

11. The method according to claim 1, wherein the peripheral audio device is a cell phone, a personal digital assistant, a computer, or a tablet computer.

12. The method according to claim 1, the method further comprising transferring, via the temporary communication channel, visual data between the peripheral audio device and the remote client, wherein the visual data comprises a still image or a video sequence.

13. A method for improving audio experience for a user of a door station of an intercommunication system, the method comprising:
   establishing a communication channel between the door station and a remote client;
   detecting a peripheral audio device in the vicinity of the door station;
   establishing a temporary communication channel between the peripheral audio device and the remote client, wherein the temporary communication channel is established in response to the remote client receiving a request from the peripheral audio device;
   transferring, via the temporary communication channel, audio data emitted and received from the peripheral audio device to the remote client; and
   terminating the temporary communication channel between the peripheral audio device and the remote client, wherein the communication channel between the remote client and the door station is maintained while establishing the temporary channel between the peripheral device and the remote client and during the duration of the temporary channel between the peripheral device and the remote client, wherein the communication channel between the remote client and the door station is maintained while terminating the temporary channel.

* * * * *